United States Patent
Winkens et al.

(10) Patent No.: US 7,509,856 B1
(45) Date of Patent: Mar. 31, 2009

(54) CAPACITANCE SENSOR FOR DETECTING THE FILL LEVEL OF A MEDIUM IN A CONTAINER

(75) Inventors: Frank Winkens, Ludwigshafen (DE); Wolfgang Frank, Viernheim (DE)

(73) Assignee: Balluff Sie Sensorick GmbH, Viernheim (DE)

( * ) Notice: Subject to any disclaimer, the term of this patent is extended or adjusted under 35 U.S.C. 154(b) by 251 days.

(21) Appl. No.: 10/577,280

(22) PCT Filed: Oct. 16, 2000

(86) PCT No.: PCT/EP00/10164

§ 371 (c)(1),
(2), (4) Date: Apr. 25, 2006

(87) PCT Pub. No.: WO01/29520

PCT Pub. Date: Apr. 26, 2001

(30) Foreign Application Priority Data

Oct. 15, 1999 (DE) .................................. 199 49 985

(51) Int. Cl.
*G01F 23/26* (2006.01)
(52) U.S. Cl. .................................................. 73/304 C
(58) Field of Classification Search ................ 73/304 C
See application file for complete search history.

(56) References Cited

U.S. PATENT DOCUMENTS

| | | | | |
|---|---|---|---|---|
| 5,532,527 A | * | 7/1996 | Zatler et al. | 307/118 |
| 5,553,479 A | * | 9/1996 | Rauchwerger | 73/1.73 |
| 5,722,290 A | * | 3/1998 | Kronberg | 73/304 C |
| 5,739,598 A | * | 4/1998 | Zatler et al. | 307/652 |

* cited by examiner

*Primary Examiner*—Hezron Williams
*Assistant Examiner*—Mark Shabman
(74) *Attorney, Agent, or Firm*—Horst M. Kasper (57) ABSTRACT

A sensor according to the invention has an amplifier that is capacitively loaded vis-à-vis the ground by a container and by a medium contained therein and that has a capacitive feedback that is dimensioned in such a way that the amplifier only oscillates when the critical filling level has not been reached. According to the invention, the capacitive feedback is influenced by the container in such a way that the capacitive load of the amplifier input caused only by the container is countered. In this manner, it is achieved that the sensor responds only to the capacitance of the medium, largely independently of the magnitude of the container capacitance. A sensor according to the invention is also characterized by such an operating frequency that, on the basis of the conductivity of the medium, it is possible to distinguish between a massive and an apparent filling of the container with the medium simulated by wetting or foam formation, but it largely avoids those problems encountered with sensors having a very high operating frequency of more than 50 MHz.

13 Claims, 3 Drawing Sheets

CAPACITANCE SENSOR FOR DETECTING THE FILL LEVEL OF A MEDIUM IN A CONTAINER

FIELD OF THE INVENTION

The invention relates to capacitive sensors having an amplifier for detecting the filling level of a medium in a container with a non-metallic wall.

DESCRIPTION OF RELATED ART

Capacitive sensors that operate contact-free and that serve to ascertain the filling level of a dielectric medium inside containers with non-metallic walls by means of electrodes affixed to the outside of the container are known and find widespread use, for example, in the chemical and pharmaceutical industries, in water treatment as well as in medical technology. The functional principle of these sensors is based on the fact that an electrode is attached to the outside of the container wall at a certain height. The electrode will be referred to below as the "active electrode" and it is arranged in such a way that, when a voltage is present, an electric field is formed between the active electrode and the ground, said field running essentially through the container and the medium held therein. The medium can be a liquid or, for instance, also a powder.

Since the medium, for example, water or an aqueous solution, has a higher dielectric constant than air, the capacitance of the active electrode increases vis-à-vis the ground as the filling level of the medium in the container rises. This capacitance will be referred to below as the "active capacitance".

A suitable electronic circuit is used to ascertain whether the capacitance between the active electrode and the ground has exceeded a certain critical value or not. In a common version known from the state of the art, such a circuit comprises an amplifier to whose input the active electrode is connected and positioned in such a way that the input is capacitively loaded by the capacitance of the active electrode vis-à-vis the ground. Once the container is filled with a medium, the capacitance of the active electrode vis-à-vis the ground increases since the dielectric constant of all solid and liquid media is greater than that of air. Therefore, the capacitive load of the input of the amplifier increases with the filling level of the medium in the container.

The amplifier is also provided with a feedback and the amplification factor of the amplifier is selected in such a manner that the amplifier oscillates due to the feedback as long as the capacitance that loads the input does has not exceeded the critical value, whereas the oscillation of the amplifier is discontinued and yields to a zero signal if the capacitance is greater than this critical value. By means of a suitable, additional circuit into which the output signal of the amplifier is fed, a switching signal can be triggered as a result of the discontinuation of the oscillation. Typically, the frequency of the oscillation lies below 1 MHz.

The thus given critical capacitance, corresponding to a certain critical filling level of the medium in the container, consequently defines the triggering point of the sensor. The value of the critical capacitance can be changed, for instance, by adjusting the amplification factor of the amplifier. As a result, the triggering point of the sensor can be adjusted.

A major drawback of such sensors lies in the fact that the active capacitance is not determined solely by the dielectric constant and by the filling level of the medium, but rather, it is also influenced by the capacitive properties of the container, that is to say, by its dimensions and shape as well as by the dielectric constant of the container material, since some of the electric field lines between the active electrode and the ground run through the wall of the container but not through the medium itself. Owning to this effect, the container functions as an additional capacitance that is detrimentally superimposed on the capacitance of the medium and that will be referred to below as the "container self-capacitance".

The part of the field lines running through the medium passes through the container material during the transition from the active electrode to the medium and during the transition from the medium to the ground, since the container wall is located between the active electrode and the medium and the container bottom is located between the medium and the ground. This boundary condition manifests itself in the occurrence of another capacitance that is connected in series with the capacitance of the medium and that will be referred to below as the "transition capacitance".

Therefore, the active capacitance encompasses three individual capacitances, one of which is essentially determined by the properties and filling level of the medium, while the other two are essentially determined by the capacitive properties of the container.

Consequently, as a result of the influence exerted by the container, the switching point of the sensor is shifted. According to the state of the art, this interference is dealt with making an appropriate adjustment of the switching point. When the container is replaced by another one with different properties, for example, by a container made of a material having a different dielectric constant or by a container having a different wall thickness, then the switching point has to be readjusted.

Another major disadvantage of sensors known from the state of the art will be presented below. In actual practice, it often happens that the medium comes into contact with parts of the inside wall of the container, even in areas above the filling level, thus wetting said areas. Such a wetting above the surface of the medium can be caused, for instance, by foam formation, by rising bubbles, by capillary effect, by condensation or by wave formation due to shaking or agitation procedures. Moreover, such wetting can occur in that the filling level of the medium in the container is lowered, for instance, due to removal of the medium, thereby leaving behind a wetted surface on the inside wall of the container.

Experience has shown that even a thin layer of the medium, formed, for example, by such a wetting of the side wall or else by the formation of foam above the surface of the medium, can result in considerable malfunctions of sensors known from the state of the art. The reason for this lies in the fact that already such a thin layer of the medium can make a considerable contribution to the capacitance between the electrode and the ground, so that the sensor cannot distinguish between an actual massive filling of the container and an apparent filling of the container simulated by wetting or foam formation. This situation can cause the sensor to be triggered even though the surface of the medium has not reached the critical filling level.

A known procedure for solving the problems associated with wetting of the container wall and foam formation consists of employing very high oscillation frequencies of typically 50 MHz to 1 GHz. The use of such a high operating frequency allows the sensor to distinguish between a massive and an apparent filling of the container with the medium simulated by wetting or foam formation. Operating a sensor at very high frequencies, however, entails the severe drawback that this largely promotes the occurrence of reflections, standing waves and other interferences inside the feed cable between the oscillator and the electrode, as a result of which the unambiguous detection of the filling level is made more difficult and the switching point is often considerably shifted. With such systems, merely touching the feed cable with the hand can already lead to a marked shift in the switching point.

Another drawback of the use of such high frequencies involves the problem of the EMC Regulations (European Product Safety and Electromagnetic Compatibility Regulations). Since the electromagnetic emission increases markedly with the frequency, it becomes difficult to comply with the applicable statutory limit values for emissions when such high frequencies are employed. Moreover, according to the EMC Regulations, the system has to be set up in such a way that external electromagnetic radiation having a field strength of 3 V/m in the frequency range from 80 MHz to 1 GHz does not cause the system to malfunction. This stipulation is very difficult to fulfill when the sensor is operated at the very high frequencies mentioned above.

Such level switches are described, for example, in German patent application DE-A42 17 305, East German patent application DD-A-221 549 as well as German patent application DE-A-44 33 677.

Technical Objective

The present invention is based on the objective of providing a capacitive sensor that operates contact-free and that is triggered when the filling level of a medium inside a container is above or below a certain critical threshold, whereby the detrimental influence of the capacitive properties of the container is neutralized to a large extent; by the same token, the triggering point of such a capacitive sensor that operates contact-free should only shift negligibly when the inside wall of the container is wetted or in the case of foam formation above the surface of the medium.

This objective is achieved according to the invention by means of a capacitive sensor having an amplifier for detecting the filling level of a medium in a container with a non-metallic wall, comprising a first electrode that is connected to the input of the amplifier and that is loaded with a first capacitance vis-à-vis the ground, so that the input of the amplifier is capacitively loaded, whereby the electrode is arranged in such a way that the electric field generated by the signal between the electrode and the ground travels essentially through the container and through the medium so that the magnitude of the first capacitance, on the one hand, increases as the filling level of the medium in the container rises and, on the other hand, is influenced by the capacitive properties of the container, said sensor comprising a second electrode that is connected to the output of the amplifier and comprising a third electrode that is connected to the input of the amplifier, whereby the second electrode and the third electrode are located at a distance from each other and are positioned in such a way that a second capacitance exists between them whose magnitude is largely influenced by the capacitive properties of the container and only negligibly influenced by the filling level of the medium in the container, said capacitance constituting a capacitive feedback of the amplifier, and also comprising a capacitor that has a third capacitance, whereby one electrode of the capacitor is connected to the output while the other electrode of the capacitor is connected to the input of the amplifier, so that the capacitor, parallel to the second capacitance, likewise constitutes a capacitive feedback of the amplifier, whereby the capacitance of the capacitor is selected in such a way that the amplifier, owing to the capacitive feedback, only oscillates when the filling level of the medium in the container and thus the first capacitance each lie below a certain threshold, whereby the second capacitance counters the capacitive influence of the container that loads the input of the amplifier, so that the capacitive influence exerted by the container is reduced.

In another preferred embodiment of the invention, the amplifier employed is an amplifier having such an intrinsic frequency that the load of the input of the amplifier is influenced by the ohmic and capacitive resistance between the electrode and the ground in such a manner that the amplifier oscillates when the filling level of the medium in the container is below a specified threshold and the inside of the wall of the container above the surface of the medium or above the threshold is wetted with a layer of the medium or when foam is present above the surface of the medium. On the other hand, the load of the input of the amplifier is influenced in such a way that any interferences caused by the occurrence of reflections, standing waves and other influences inside the feed cable between the oscillator and the electrode are insignificant and the valid EMC Regulations are complied with. In an extremely advantageous manner, it is then possible to detect wetting of the inside wall of the container or foam formation above the surface of the medium as such and to distinguish it from an actual massive filling of the container.

Therefore, a decisive factor is the selection of the operating frequency. Through the use of a higher operating frequency than is commonly found in conventional sensor technology, the capacitive reactive resistance between the electrodes and the medium can be reduced. This reactive resistance of the coupling to the medium now becomes much smaller than the real resistance of moist adhering medium and foams. In this manner, the sensor can also perform a contact-free evaluation through the container wall, to a certain extent, also an evaluation of the conductivity of the medium located behind the wall. According to flow field theory, thin water films and foams have a higher current density and a considerably lower conductivity than the compact medium. Therefore, a distinction can be made between a full container and thin water films caused by condensation or by adhering, foaming media. The compensation electrode, in FIG. 2 or 3 this is the compensation electrode 12, intervenes in this process in a supporting capacity. In conventional sensor technology, the operating frequencies are selected at much lower values, which is why the capacitive reactive resistances of the coupling to the medium are higher than the real resistances of adhering medium. Therefore, as far as the state of the art is concerned, a full container and adhering medium always constitute a "short circuit" relative to the ground and cannot be distinguished from each other.

In the case of the sensor according to the invention, the feedback is effectuated by means of two capacitances connected in parallel. One of these capacitances is formed by a capacitor having a constant capacitance that is independent of the filling level of the medium in the container and independent of the capacitive properties of the container, and it will be referred to below as the "fixed feedback capacitance". This capacitor has the task of ensuring an oscillation of the amplifier whenever the capacitive load of the input is below the critical filling level.

The other one of these capacitances is formed by two electrodes that are positioned in such a way that the capacitance that exists between them, which will be referred to below as the "compensation capacitance", is largely determined by the properties of the container. This is advantageously achieved in that both electrodes are installed at a distance from each other close to the container wall and are oriented in such a way that the electric field that runs between both electrodes runs to a considerable extent inside the container wall. The one of these two electrodes that is connected to the output of the amplifier will be referred to below as the "compensation electrode". At a given oscillation frequency of the amplifier, the larger the compensation capacitance, the more intense the feedback.

Thus, according to the invention, the capacitive properties of the container exert opposing influences on the magnitude of the input signal of the amplifier.

On the one hand, the capacitive properties of the container raise the active capacitance, which capacitively loads the output of the amplifier and decreases the input signal of the amplifier. On the other hand, the capacitive properties of the container intensify the capacitive feedback of the amplifier, which increases the input signal.

These opposing effects neutralize each other, at least partially. A suitable selection of the installation site and of the dimensions of the electrodes in question causes these effects to virtually cancel each other out. In this case, the influence of the capacitive properties of the container on the switching point of the sensor is largely eliminated. Consequently, it is very often possible to dispense with a readjustment of the sensor when a container having different capacitive properties is used, for instance, a container made of a different material or having a different wall thickness, and this constitutes a major advantage in many applications. Only when a sensor according to the invention is employed does it become feasible to use containers having very thick walls, which in many applications can be practical due to thermal insulation considerations.

Another advantage lies in the fact that the triggering point of a sensor according to the invention not only remains largely stable when the container is replaced by another having different capacitive properties, but also when the capacitive properties of one and the same container change during operation of the sensor.

This can be the case, for instance, when a hot liquid is filled into the container and then cools off. Due to the change in temperature, the dielectric constant of the container material changes and so does the capacitive influence of the container. Therefore, when a sensor known from the state of the art is employed, the triggering point will be subject to a temperature drift that often needs to be countered by readjusting the switching point accordingly. In contrast, when the sensor according to the invention is employed, it is very often possible to dispense with this procedure since here the triggering point is stabilized vis-à-vis the capacitive influence of the container and thus also vis-à-vis a change in this influence.

A sensor according to the invention also differs from a sensor according to the state of the art in terms of its operating frequency, that is to say, the frequency at which the amplifier oscillates when the filling level of the medium in the container is below the critical filling level.

As mentioned above, conventional sensors have an operating frequency which, at typically 100 kHZ to 1 MHz, is so low that substantial faulty measurements can result in case of wetting of the container inside wall is wetted or in case of foam formation above the surface of the medium, a problem that can be solved by using very high oscillation frequencies of typically 50 MHz to 1 GHz which, however, give rise to other major drawbacks.

It has been found within the scope of the present invention that these disadvantages can be largely eliminated by using an operating frequency in the range from about 4 MHz to about 10 MHz, whereas the considerable advantage still remains that wetting of the inside wall of the container or foam formation above the surface of the medium can be recognized as such on the basis of its conductivity and can be distinguished from an actual, massive filling of the container. Accordingly, through the selection of the operating frequency in the range from about 4 MHz to about 10 MHz, a sensor according to the invention is capable of concurrently utilizing the capacitive properties and the conductivity of the medium in order to detect the filling level.

The capability of a sensor according to the invention to recognize wetting of the inside wall of the container or foam formation above the surface of the medium as such on the basis of its conductivity and to distinguish this from an actual, massive filling of the container is based on the principle explained below. If the actual, massive filling level of the medium is below the critical filling level and if wetting of the inside wall of the container or foam formation is present above the surface of the medium, then the thin liquid film constitutes a resistance which, in a first approximation, does not depend on the frequency and is present between the transition capacitance and the capacitance of the medium. Therefore, the liquid film functions like an ohmic resistance between two capacitive resistances. The input of the amplifier is loaded by the cumulative value of these three resistance components.

When a low operating frequency is used, these capacitive resistances are very high since the capacitive resistance is inversely proportional to the frequency. Consequently, in this case, the ohmic resistance only makes a relatively small contribution to the sum of the resistances, in other words, the liquid film only plays a subordinate role in the load of the input of the amplifier. Therefore, in terms of the sum of the resistances and thus of the triggering of the sensor, it is immaterial whether it is a case of an actual massive filling or an appearance of filling of the container with the medium simulated by wetting or foam.

In contrast, when a very high operating frequency is employed, these capacitive resistances are very low. Therefore, in this case, the ohmic resistance makes a relatively large contribution to the sum of the resistances, that is to say, the liquid film plays an major role in the load of the input of the amplifier. Therefore, in terms of the sum of the resistances and thus of the triggering of the sensor, it is crucial whether it is case of an actual massive filling of the container (low ohmic resistance, sensor is triggered) or an appearance of filling of the container with the medium simulated by wetting or foam (high ohmic resistance, sensor is not triggered).

In another embodiment of the sensor that is preferred according to the invention, one electrode of the sensor consists of a plurality of electrodes connected to each other. Here, preferably at least one electrode is arranged inside the container and it is immersed into the medium when a certain filling level is exceeded.

In another embodiment of the sensor, the first electrode and the third electrode coincide, thus forming a first combined electrode. Or else the first electrode and the electrode of the capacitor on the input side of the amplifier can coincide and thus form a combined electrode. By the same token, it is possible for the first electrode, the third electrode and the electrode of the capacitor on the input side of the amplifier to all coincide and thus form a second combined electrode. In another embodiment, the second electrode and the electrode of the capacitor on the input side of the amplifier can coincide and thus form a third combined electrode. In another embodiment, the first combined electrode and the second combined electrode can be rigidly connected to each other. In another embodiment of the invention, the second combined electrode and the third combined electrode can be arranged concentrically.

In another embodiment of the invention, the third combined electrode has a first plate and a cutout second plate, which is connected to the first plate by means of a conductor and which is arranged at a distance from the first plate and concentrically to it, whereby the first combined electrode lies in a plane with the cutout second plate and is arranged inside said cutout. Here, the first plate can be attached to one side of a printed circuit board and the cutout second plate and the second combined electrode can be attached to the other side of the printed circuit board.

In another embodiment of the invention, the sensor is part of such a circuit that supplies a switching signal when the amplifier is not oscillating.

BRIEF DESCRIPTION OF THE DRAWINGS

The following is shown.

WAYS TO EXECUTE THE INVENTION

Figure 1:
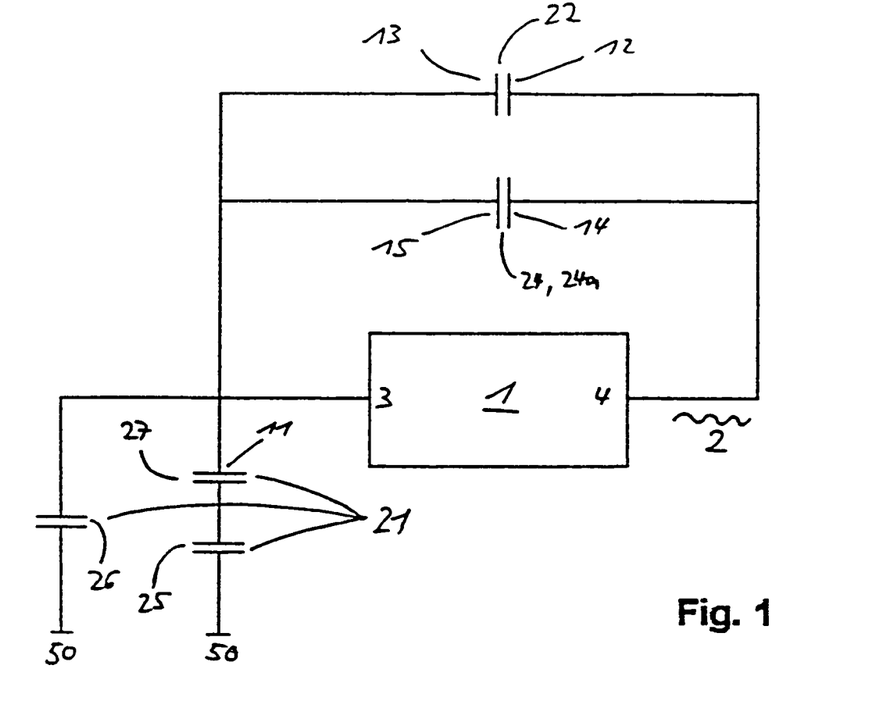
FIG. 1—a block diagram of a sensor according to the invention with the capacitances that are essential for its function.
Figure 2:
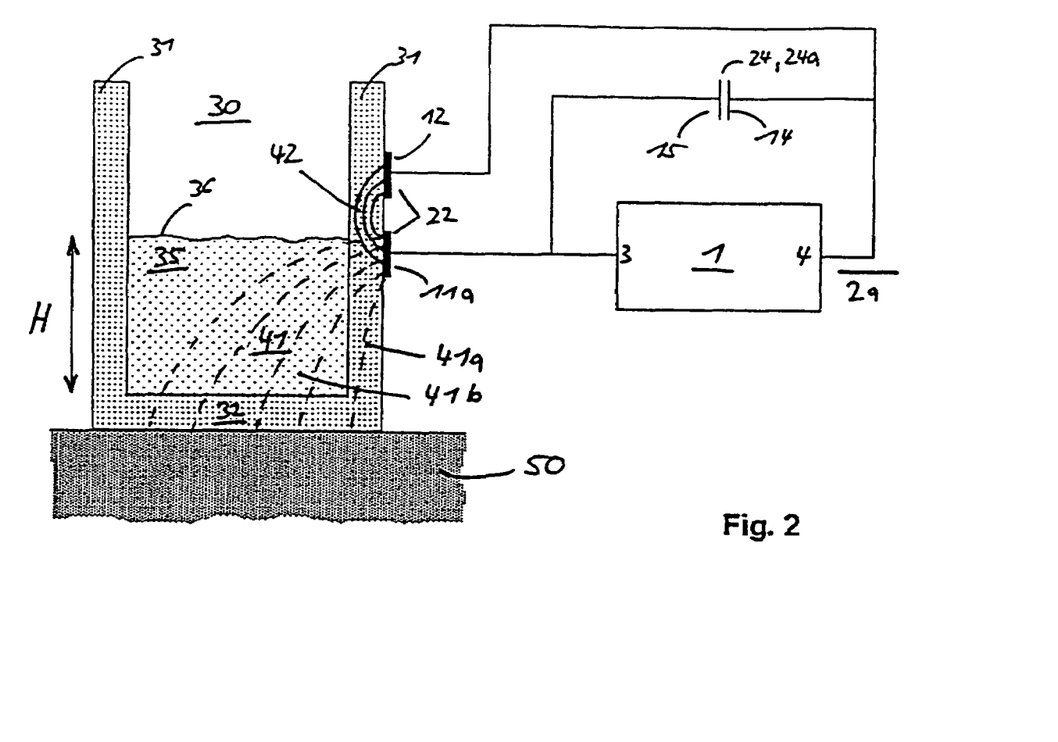
FIG. 2—a schematic diagram of an embodiment of a sensor according to the invention and the course of the electric fields in the case of filling level that is higher than the critical filling level.

FIG. 1 shows a block diagram of a sensor according to the invention with the capacitances that are essential for its function. The output 4 of an amplifier 1 is connected to an electrode 11 that constitutes the active electrode of the sensor. This active electrode 11 is preferably attached close to the wall 31 on the outside of the container 30 at a certain height above the bottom 32 of the container 30 (FIG. 2).

The active electrode 11 is loaded with a capacitance 21 vis-à-vis the ground 50, said capacitance, as explained above, consisting of a transition capacitance 27 and of a capacitance 25 of the medium 35 that acts in series with said transition capacitance 27 as well as an intrinsic capacitance 26 of the container 30 that acts in parallel thereto (FIG. 1). Only the capacitance 25 of the medium 35 is dependent on the filling level. When the filling level rises, so does the capacitance 25 of the medium 35 and with it the active capacitance 21 as well, so that the capacitive load of the input 3 of the amplifier 1 is increased.

The fixed feedback capacitance 24 is created by a capacitor 24a. It ensures that the amplifier 1 always oscillates when the filling level in the container falls below a critical value that is influenced, for instance, by the selection of the amplification factor. In a preferred embodiment, a switching signal is triggered by means of a suitable circuit which can comprise, for example, a rectifier, an integration member and a comparator, when the critical filling level is exceeded.

At a distance from the active electrode 11, an electrode 12 is installed that is connected to the output 4 of the amplifier 1 and that constitutes the compensation electrode of the sensor according to the invention. It is loaded with a capacitance 22 vis-à-vis an electrode 13 that is connected to the input 3 of the amplifier 1, said electrodes 12 and 13 being positioned in such a way that the electric field that exists between these electrodes, passes through the container material to a considerable extent when a voltage is present. The capacitance 22 constitutes the compensation capacitance of the sensor according to the invention. According to the invention, the influence of the capacitance 22 counteracts the influence of the container capacitance.

Figure 3:
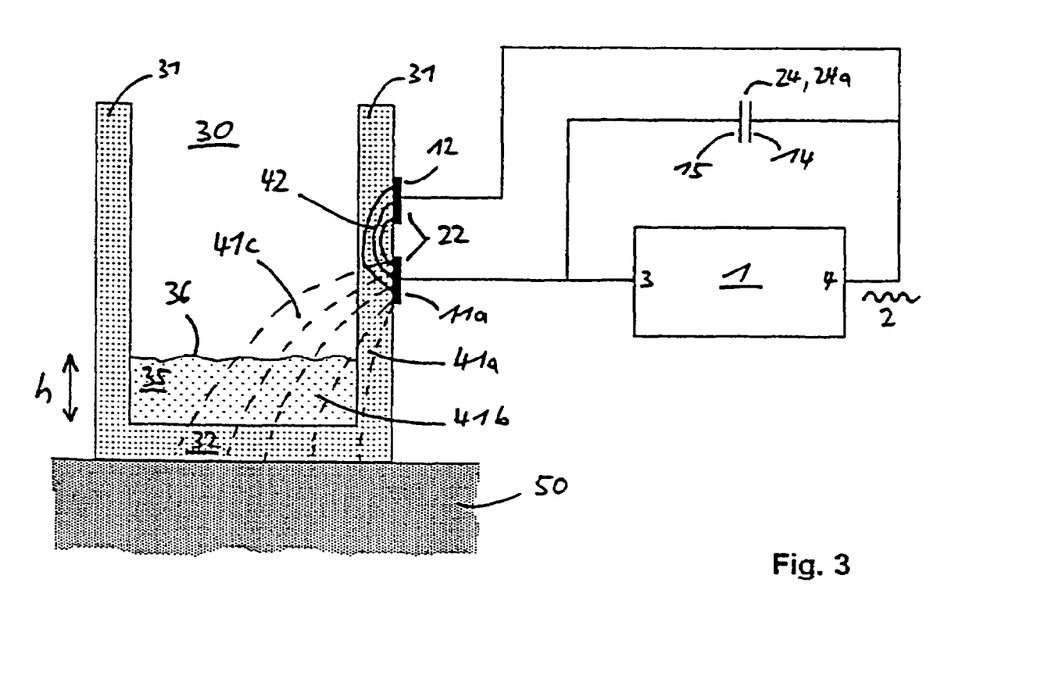
FIG. 3—a schematic diagram of an embodiment of a sensor according to the individual and the course of the electric fields in the case of filling level that is lower than the critical filling level.

Reference will now be made to FIGS. 2 and 3, which show an embodiment of the invention in which the electrode 13 is advantageously united with the active electrode 11 to form a combined electrode 11a, so that the compensation capacitance 22 is present between the combined electrode 11a and the compensation electrode 12. When a voltage is present between these two electrodes, an electric field 42 is formed that runs essentially through the container wall 31, so that, according to the invention, the compensation capacitance 22 is dependent on the capacitive properties of the container 30.

In FIG. 2, the container 30 is filled with the medium 35 up to a height H that is higher than the critical filling level. FIG. 2 shows the electric field 41 (drawn with a broken line) that, in this case, is formed when a voltage is present between the combined electrode 11a and the ground 50 (the refraction of the field lines on boundary surfaces was not taken into account in the drawing). A considerable part 41a of the electric field 41 passes through the medium 35 whereby this part of the electric field also traverses the container wall 31 and the container bottom 32, which corresponds to the transition capacitance 27 in FIG. 1. Another part 41b of the electric field 41 does not pass through the medium 35, but rather, runs essentially inside the container wall 31, which corresponds to the container intrinsic capacitance 26 in FIG. 1. Due to the high filling level, the capacitive load of the input 3 of the amplifier 1 is so large that the amplifier 1 does not oscillate. Therefore, a zero signal 2a is present at the output 4.

In FIG. 3, the container 30 is filled up with the medium 35 to a height h that is lower than the height H in FIG. 2 and lower than the critical filling height. It can be seen that, in this case, a part 41c of the electric field 41 (drawn with a broken line) no longer runs through the medium 35 when a voltage is present between the combined electrode 11a and the ground 50, but rather it runs through air above the surface 36 of the medium 35, as a result of which the active capacitance 21 (FIG. 1) is reduced in comparison to the case depicted in FIG. 2. Due to the high filling level, the capacitive load of the input 3 of the amplifier 1 is so small that the amplifier 1 oscillates. Therefore, a signal 2 is present at the output 4.

Figure 4:
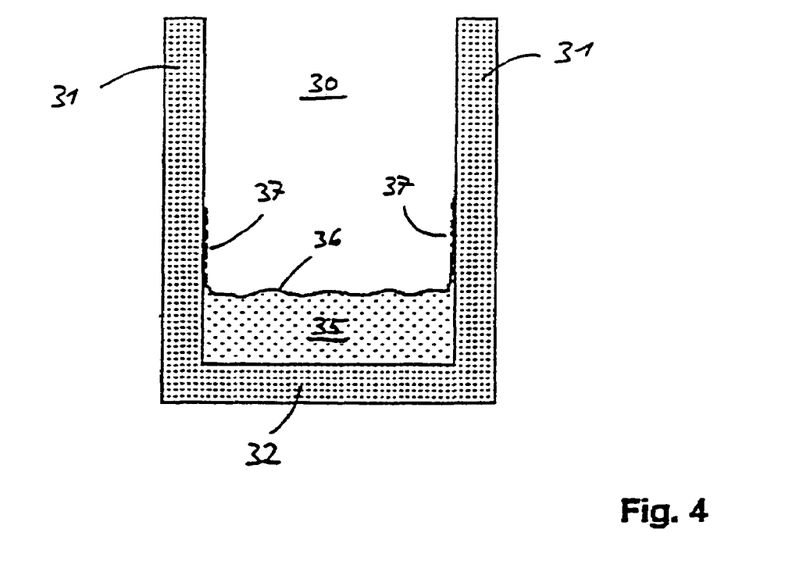
FIG. 4—a cross sectional view of the container with a layer of the medium adhering to its inside walls.

FIG. 4 shows a cross sectional view of the container 30, which is filled with the medium 35 up to a certain height. A layer 37 of the medium adheres to the inside of the container wall 31 above the surface 36 of the medium 35. In order to allow a distinction to be made between a massive filling of the container and an apparent filling of the container simulated by wetting or foam formation while concurrently utilizing the capacitive properties of the medium and its conductivity, the sensor is operated according to the invention at an operating frequency of typically 4 MHz to 10 MHz. In a preferred embodiment, the operating frequency is about 7 MHz. Other operating frequencies are likewise possible and can be implemented, for instance, by appropriately equipping or parameterizing the amplifier 1.

Figure 5:
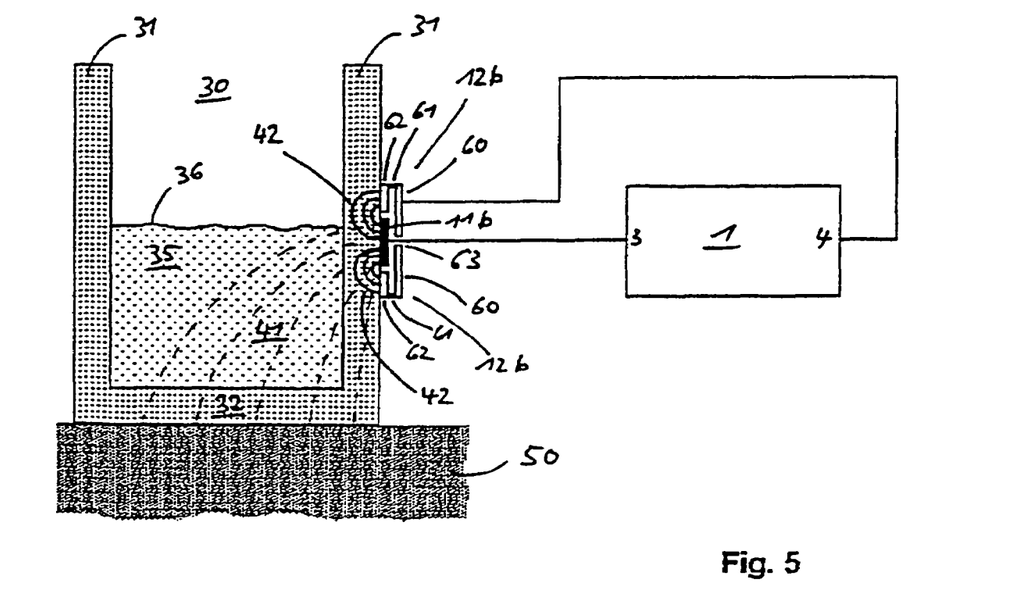
FIG. 5—a cross sectional view of a preferred arrangement of the electrodes.
Figure 6:
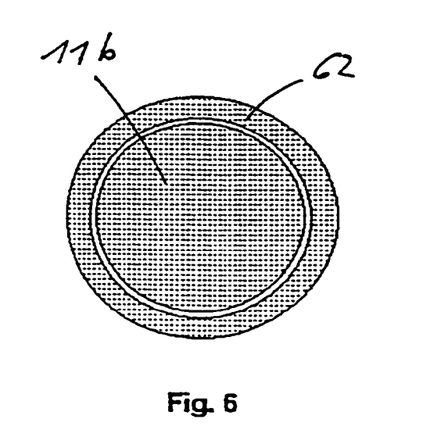
FIG. 6—a front view of a preferred arrangement of the electrodes.

FIG. 5 shows a sensor according to the invention with a preferred configuration of the electrodes in which the electrodes are rigidly connected to each other. The electrodes 11, 13 and 15 are united to form a disk-shaped combined electrode 11b. At the same time, the electrodes 12, 14 are united to form a combined electrode 12b comprising a disk-shaped back plate 60 and a cutout front plate 62, which are rigidly and conductively connected to each other by means of an electrically conductive hollow-cylindrical spacer 61 located on the outer edges. The combined electrode 11b is arranged concentrically in the cutout of the cutout front plate 62 and lies in a plane with the latter (FIG. 6). The back plate 60 has a central bore 63 that serves as a passage for the electric connection of the combined electrode 11b. The fixed feedback capacitance 24 in this embodiment is essentially formed by the combined electrode 11b and the back plate 60, whereas the compensation capacitance is essentially formed by the combined electrode 11b and the cutout front plate 62.

In another preferred embodiment, the combined electrode 11b and the cutout front plate 62 are each configured as circuit-board conductors on one side of an insulating layer, whereas the back plate 60 is configured as a circuit-board conductor on the other side of the insulating layer. In a preferred embodiment, the insulating layer consists of a printed circuit board material that can be, for instance, of the Fr4 type.

Figure 7:
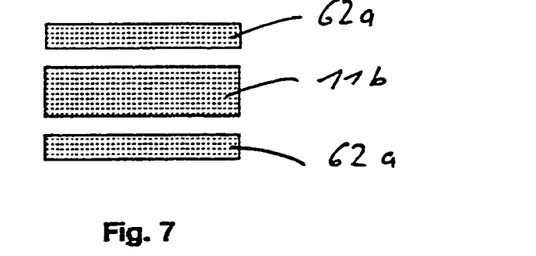
FIG. 7—a front view of another arrangement of the electrodes.
Figure 8:
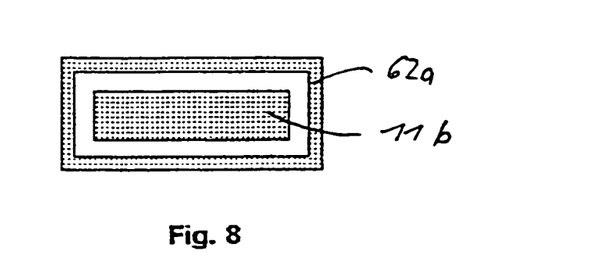
FIG. 8—a front view of yet another arrangement of the electrodes.

Other geometrical arrangements of the electrodes are possible. FIG. 7 shows an embodiment in which the combined electrode 11b has a rectangular shape. Here, the cutout front plate 62 (FIG. 6) is replaced by two track conductors 62a located on opposite sides of the combined electrode 11b. FIG. 8 shows another embodiment in which the combined electrode 11b is rectangular in shape and has a track conductor 62a running around its edge.

In another embodiment (not shown here), the sensor has at least one group consisting of a plurality of electrodes that are connected to each other. For example, the active electrode 11 can be split into a plurality of sections that are connected to each other and arranged at different places. One application of this embodiment is, for instance, for the simultaneous monitoring of the filling levels in several containers in which triggering of the sensor is desired when a given critical filling level has been exceeded in at least one of the containers.

In another embodiment (not shown here), the active electrode 11 is arranged inside the container 30 close to its inside wall in such a way that is immersed into the medium 35 when the filling level exceeds a certain value. The operation of the sensor is not impaired by this arrangement. If the inside walls of the container 30 are wetted after the filling level has subsequently been lowered or in case of foam formation up to the height where the active electrode 11 has been installed, the electrode 11 itself is also affected by the wetting. In an embodiment of the invention in which the oscillator is operated at an operating frequency in the range from about 4 MHz to about 10 MHz, the ability is retained to distinguish between a massive filling of the container and an apparent filling of the container simulated by wetting or foam formation.

According to the invention, the electrodes can be arranged inside or outside of the container.

In another embodiment of the invention (not shown here), the sensor is safeguarded against penetration by the medium and arranged inside the container 30 in such a way that the sensor is immersed into the medium 35 when the filling level exceeds a certain value.

INDUSTRIAL APPLICABILITY

The capacitance sensor according to the invention that operates contact-free is especially well-suited to detect a filling level of a medium in a container having a non-metallic wall. The usefulness of the sensor lies in the fact that it is triggered when the filling level of a medium in a container is above or below a certain critical threshold whereby, however, the detrimental influences of the capacitive properties of the container are neutralized to a considerable extent. In a highly advantageous manner, the triggering point of the sensor shifts only negligibly when the inside wall of the container is wetted or in the case of foam formation above the surface of the medium. This is why the sensor can advantageously distinguish between a full vessel and a partially empty vessel where medium has adhered to the inside wall of the vessel or in the case of foam on the surface of the medium.

| List of reference numerals | |
|---|---|
| 1 | amplifier |
| 2 | alternating-voltage signal at the input of the amplifier |
| 3 | input of the amplifier |
| 4 | output of the amplifier |
| 11 | first electrode (active electrode) |
| 11a | combined electrode (comprising the electrodes 11, 13) |
| 11b | combined electrode (comprising the electrodes 11, 13, 15) |
| 12 | second electrode (compensation electrode) |
| 12b | combined electrode (comprising the electrodes 12, 14) |
| 13 | third electrode |
| 14 | electrode of the capacitor on the output side of the amplifier |
| 15 | electrode of the capacitor on the input side of the amplifier |
| 21 | first capacitance (active capacitance) |
| 22 | second capacitance (compensation capacitance) |
| 23 | three capacitance (fixed feedback capacitance) |
| 24a | capacitor |
| 25 | capacitance of the medium |
| 26 | container self-capacitance |
| 27 | transition capacitance |
| 30 | container |
| 31 | container wall |
| 32 | container bottom |
| 35 | medium |
| 36 | surface of the medium |
| 37 | layer of the medium adhering to the container wall |
| 41 | electric field between the first electrode and the ground |
| 42 | electric field between the first electrode and the second electrode |
| 50 | ground |
| 60 | back plate |
| 61 | spacer |
| 62 | cutout front plate |
| 62a | track conductors |
| 63 | bore |

The invention claimed is:

1. A capacitive sensor for detecting the filling level of a medium (35) in a container (30) with a non-metallic wall (31), said sensor being connected to the earth or ground (50), comprising an amplifier (1) with an input (3) and an output (4), said amplifier (1) being provided with a feedback, and said sensor also comprising a circuit that supplies a switching signal when the amplifier (1) is not oscillating, characterized by a first electrode (11) that is connected to the input (3) of the amplifier (1) and that is loaded with a first capacitance (21) vis-a-vis the ground (50), so that the input (3) of the amplifier (1) is capacitively loaded, whereby the first electrode (11) is arranged in such a way that the electric field (41) generated between the first electrode (11) and the ground (50) by the signal (2) that is fed back from the output (4) of the amplifier (1) to the input (3), runs essentially through the container (30) and through the medium (35) to the ground (50) so that the magnitude of the first capacitance, on the one hand, increases as the filling level of the medium (35) in the container (30) rises and, on the other hand, is influenced by the capacitive properties of the container (30), by a second electrode (12) that is connected to the output (4) of the amplifier (1) and by a third electrode (13) that is connected to the input (3) of the amplifier (1), whereby the second electrode (12) and the third electrode (13) are located at a distance from each other on the container wall (31) of the container (30) and are positioned in such a way that, due to an electric field (42) that is generated, a second capacitance (22) exists between them whose magnitude is largely influenced by the capacitive properties of the container (30) or of the container wall (31) and only negligibly influenced by the filling level of the medium (35) in the container (30), said second capacitance constituting a capacitive feedback of the amplifier (1), whereby the first electrode (11) and the third electrode (13) can coincide and, in this case, form a first combined electrode (11a), and also comprising a capacitor (24a) that has a third capacitance (24), whose magnitude is essentially influenced neither by the capacitive properties of the container (30) nor by the filling level of the medium (35) in the container (30), whereby one fourth electrode (14) of the capacitor (24a) is connected to the output (4) while the other fifth electrode (15) of the capacitor (24a) is connected to the input (3) of the amplifier (1), so that the capacitor (24a), parallel to the second capacitance (22), likewise constitutes a capacitive feedback of the amplifier (1), whereby the third capacitance (24) of the capacitor (24a) is selected in such a way that the amplifier (1), owing to the capacitive feedback, only oscillates when the filling level of the medium (35) in the container (30) and thus the first capacitance (21) each lie below a certain threshold, whereby the second capacitance (22) counters the capacitive influence of the container (30) that loads the input (3) of the amplifier (1), so that the capacitive influence exerted by the container (30) is reduced.

2. The sensor according to claim 1, characterized in that the first combined electrode (11a), the third electrode (13) and the fifth electrode (15) of the capacitor (24a) on the input side of the amplifier all coincide and thus form a second combined electrode (11b).

3. The sensor according to claim 2, characterized in that the second combined electrode (11b) and the third combined electrode (12b) are mechanically rigidly connected to each other and optionally arranged concentrically.

4. The sensor according to claim 2, characterized in that the third combined electrode (12b) has a first plate (60) and a cutout second plate (62), which is connected to the first plate (60) by means of a conductor (61) and which is arranged at a distance from the first plate (60) and concentrically to it, whereby the second combined electrode (11b) lies in a plane with the cutout second plate (62) and is arranged inside said cutout.

5. The sensor according to claim 1, characterized in that the second electrode (12) and the fourth electrode (14) of the capacitor (24a) on the output side of the amplifier coincide and thus form a third combined electrode (12b).

6. The sensor according to claim 4, characterized in that the first plate (60) is attached to one side of a printed circuit board and the cutout second plate (62) and the second combined electrode (111b) are attached to the other side of the printed circuit board.

7. The sensor according to claim 1, characterized in that the sensor is part of a circuit that supplies a switching signal when the amplifier (1) is not oscillating.

8. The sensor according to claim 1, characterized in that the dimensioning of the amplifier (1) causes it to have a high operating frequency, whereby, due to the high operating frequency range, the capacitive reactive resistance of the coupling of the first electrode (11), of the second electrode (12), and of the third electrode (13) to the medium (35) is reduced to such an extent that thin adhering layers or foams of the medium (35) with their low conductivity can be clearly distinguished from the compact medium with its higher conductivity, whereby if the filling level of the medium is below a certain threshold, while adhering medium or foam is present above the surface of the medium or above the filling level of the medium, the load of the input (3) of the amplifier (1) is influenced by the ohmic and capacitive resistance between the first electrode (11) and the ground (50) in such a way that the amplifier (1) oscillates.

9. The sensor according to claim 1, characterized in that one sixth electrode of the sensor consists of a plurality of electrodes connected to each other.

10. The sensor according to claim 1, characterized in that at least one seventh electrode is arranged inside the container (30) and it is immersed into the medium (35) when a certain filling level is exceeded.

11. The sensor according to claim 1, characterized in that the sensor is arranged inside the container (30) and it is immersed into the medium (35) when a certain filling level is exceeded.

12. A capacitive sensor for detecting the filling level of a medium (35) in a container (30) with a non-metallic wall (31), said sensor being connected to the earth or ground (50), comprising an amplifier (1) with an input (3) and an output (4) and having an amplification factor that is greater than 1, said amplifier (1) being provided with a feedback, and said sensor also comprising a circuit that supplies a switching signal when the amplifier (1) is not oscillating, also comprising a first electrode (11) that is connected to the input (3) of the amplifier (1) and that is loaded with a first capacitance (21) vis a-vis the ground (50), so that the input (3) of the amplifier (1) is capacitively loaded, which brings about a decrease of a signal (2) that is present at the input (3) of the amplifier (1), whereby the first electrode (11) is arranged in such a way that the electric field (41) generated by the signal (2) between the first electrode (11) and the ground (50) travels essentially through the container (30) and through the medium (35) so that the magnitude of the first capacitance increases as the filling level of the medium (35) in the container (30) rises, also comprising a second electrode (12) that is connected to the output (4) of the amplifier (1) and comprising a third electrode (13) that is connected to the input (3) of the amplifier (1), whereby the first electrode (12) and the second electrode (13) are at a distance from each other and are positioned in such a way that a second capacitance (22) exists between them whose magnitude is largely influenced by the capacitive properties of the container (30) and only negligibly influenced by the filling level of the medium (35) in the container (30), said second capacitance bringing about a capacitive feedback of the amplifier (1), which brings about an increase of a signal (2) present at the input (3) of the amplifier (1), and also comprising a capacitor (24a) that has a third capacitance (24), whose magnitude is essentially influenced neither by the capacitive properties of the container (30) nor by the filling level of the medium (35) in the container (30), whereby one fourth electrode (14) of the capacitor (24a) is connected to the output (4) while the other fifth electrode (15) of the capacitor (24a) is connected to the input (3) of the amplifier (1), so that the capacitor (24a), parallel to the second capacitance (22), likewise brings about a capacitive feedback of the amplifier (1), which brings about a further increase of the signal (2) that is present at the input (3) of the amplifier (1), whereby the third capacitance (24) of the capacitor (24a) is selected in such a way that the amplifier (1), owing to the capacitive feedback, only oscillates when the filling level of the medium (35) in the container (30) and thus the first capacitance (21) each lie below a certain threshold, whereby the amplifier employed is an amplifier (1) having an operating frequency between about 4 MHz and about 10 MHz, as a result of which the load of the input (3) of the amplifier (1) is influenced by the ohmic and capacitive resistance between the first electrode (11) and the ground (50) in such a manner that the amplifier (1) oscillates when the filling level of the medium (35) in the container (30) is below this threshold and the inside of the wall (31) of the container (30) above the surface (36) of the medium (35) is wetted with a layer (37) of the medium (35) or when foam is present above the surface (36) of the medium (35), whereby the second capacitance (22) is selected in such a way that the decrease of the signal (2) due to the capacitive load of the input (3) of the amplifier (1) is countered only by the capacitive properties of the container (30) as a result of the increase of the signal (2) that is caused by the capacitive feedback only by the second capacitance (22), whereby the first electrode (1) and the fifth electrode (15) of the capacitor (24a) on the input side of the amplifier form a disk-shaped second combined electrode (11b) that is configured as a strip-like conductor (62a) on a first side of a printed circuit board, and whereby the second electrode (12) and the fourth electrode (14) of the capacitor (24a) coincide and form a third combined electrode (12b) that is mechanically rigidly connected to the second combined electrode (11b) and that has a disk-shaped first plate (60) that is configured as a track conductor on the other side of the printed circuit board, as well as a ring-shaped cutout second plate (62) that lies in a plane with the second combined electrode (11b) and surrounds it concentrically and that is configured as a conductor track on the first side of the printed circuit board and that is arranged concentrically to the first plate (60).

13. The sensor according to claim 12, characterized in that the second combined electrode (11b) is disk-shaped and the third combined electrode (12b) has a disk-shaped back plate (60) and a cutout front plate (62), which are electrically conductively and mechanically rigidly connected to each other by means of an electrically conductive hollow-cylindrical spacer (61) located on their outer edges, whereby the second combined electrode (11b) is arranged concentrically in the cutout of the cutout front plate (62) and lies in a plane with the latter, whereby the fixed feedback third capacitance (24) is essentially formed by the second combined electrode (11b) and by the back plate (60), whereas the compensation capacitance is essentially formed by the second combined electrode (11b) and the cutout front plate (62).

* * * * *